(12) United States Patent
Heideman

(10) Patent No.: US 11,204,234 B1
(45) Date of Patent: Dec. 21, 2021

(54) HIGH SPEED WIDE FIELD AUTOCOLLIMATOR

(71) Applicant: RAYTHEON COMPANY, Waltham, MA (US)

(72) Inventor: Kyle Heideman, Hawthorne, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/018,035

(22) Filed: Sep. 11, 2020

(51) Int. Cl.
*G01B 9/02* (2006.01)
*G01B 11/26* (2006.01)

(52) U.S. Cl.
CPC ....... *G01B 9/0203* (2013.01); *G01B 9/02041* (2013.01); *G01B 11/26* (2013.01); *G01B 2290/20* (2013.01); *G01B 2290/70* (2013.01)

(58) Field of Classification Search
CPC .. G01B 9/02029; G01B 9/0203; G01B 11/26; G01B 11/27; G01B 11/272; G01B 2290/20; G01B 2290/70
USPC .......................................................... 356/510
See application file for complete search history.

(56) References Cited

U.S. PATENT DOCUMENTS

| | | | |
|---|---|---|---|
| 3,829,219 A | 8/1974 | Wyant | |
| 5,995,215 A * | 11/1999 | Hayes | G01B 11/26 356/153 |
| 6,924,899 B2 | 8/2005 | Hutchin et al. | |
| 2004/0207835 A1 * | 10/2004 | Miyata | G02B 27/30 356/153 |
| 2009/0009771 A1 * | 1/2009 | Ostrovsky | G01B 9/02032 356/479 |
| 2013/0083323 A1 * | 4/2013 | Tan | G02B 5/122 356/364 |
| 2018/0017382 A1 * | 1/2018 | Adachi | G01B 11/26 |

(Continued)

FOREIGN PATENT DOCUMENTS

DE 102011012611 A1 * 8/2012 ............. G01B 11/26

OTHER PUBLICATIONS

Wang, Chang-geng et al. "Autocollimation form dual-frequency laser diffraction grating interferometer design and analysis". 2010 International Conference on Computer, Mechatronics, Control and Electronic Engineering (CMCE), 2010, pp. 148-150. (Year: 2010).*

(Continued)

*Primary Examiner* — Michael A Lyons
(74) *Attorney, Agent, or Firm* — Lando & Anastasi, LLP

(57) ABSTRACT

An optical system includes a light source, a target device, an image detector, and an autocollimator that receives a beam of electromagnetic radiation from the light source, directs the beam to the target device, and directs the beam to the image detector. The autocollimator includes a first polarizing beam splitter that directs the beam to the target device and receives the beam reflected off of the target device, a second polarizing beam splitter that receives the beam from the first polarizing beam splitter, directs the beam to a diffraction grating device, returns diffracted electromagnetic radiation from the diffraction grating device to an array of detectors, and directs the diffractive electromagnetic radiation, a camera that measures an interference pattern of diffracted electromagnetic radiation from the second polarizing beam splitter and captures an image, and a lens assembly that focuses electromagnetic radiation from the target device to the diffraction grating device.

20 Claims, 4 Drawing Sheets

(56) References Cited

U.S. PATENT DOCUMENTS

2020/0049493 A1     2/2020   Heideman
2021/0239565 A1*   8/2021   Dahl ..................... G01B 11/25

OTHER PUBLICATIONS

Chen, Yuan-Liu et al. "Mode-locked laser autocollimator with an expanded measurement range". Optics Express, vol. 24, No. 14, Jul. 11, 2016, p. 15554-15569. (Year: 2016).*

Shimizu, Yuki et al. "Optical Sensors for Multi-Axis Angle and Displacement Measurement Using Grating Reflectors". Sensors for Precision Dimensional Metrology, Dec. 1, 2019, pp. 1-33. (Year: 2019).*

* cited by examiner

HIGH SPEED WIDE FIELD AUTOCOLLIMATOR

BACKGROUND

With optical instruments, improving the range of the instrument and improving the resolution of the instrument are two competing concepts. Increasing or improving range usually decreases or denigrates resolution and vice versa. In addition, under circumstances requiring speed of receiving the image, balancing range and resolution is very difficult. Autocollimators are often used to measure a tilt of an optical surface. While an autocollimator can measure surfaces over a large range of angles, most available autocollimators result in reduced resolution and are very slow. Many applications would benefit from absolute angle knowledge over a large range with high resolution and high speed measurements. For example, calibrating steering mirror motions over large range capturing both angle and jitter performance.

High sample rate autocollimators exist but are limited by two-dimensional (2-D) array frame rates. Wide field autocollimators require more pixels which further slows the sample rate. Other methods of achieving high sample rates require a very narrow measurement range. One example utilizes a distance measuring interferometer. This provides high resolution and sample rate, but a small measurement range. It is also a relative measurement. If the beam is blocked or lost at any point, the system loses its knowledge of absolution position.

SUMMARY

One aspect of the present disclosure is directed to an optical system comprising a broadband light source configured to generate a beam of electromagnetic radiation, a target device to be tested, an image detector configured to measure a tilt of the target device based on a measurement of the beam of electromagnetic radiation reflected off of the target device, and an autocollimator configured to receive the beam of electromagnetic radiation from the broadband light source, direct the beam of electromagnetic radiation to the target device, and direct the beam of electromagnetic radiation to the image detector. The autocollimator includes a first polarizing beam splitter configured to direct the beam of electromagnetic radiation to the target device and to receive the beam of electromagnetic radiation reflected off of the target device, a second polarizing beam splitter configured to receive the beam of electromagnetic radiation from the first polarizing beam splitter, direct the beam of electromagnetic radiation to a diffraction grating device, return diffracted electromagnetic radiation from the diffraction grating device to a linear array of detectors, and direct the diffractive electromagnetic radiation, at least one line scan camera configured to measure an interference pattern of diffracted electromagnetic radiation from the second polarizing beam splitter and capture an image, and at least one lens to focus electromagnetic radiation from the target device to the diffraction grating device.

Embodiments of the optical system further may include configuring the autocollimator with a collimation lens configured to receive the beam of electromagnetic radiation from the broadband light source. The optical system further may include a fold mirror configured to direct the beam of electromagnetic radiation from the collimation lens to the first polarizing beam splitter. The optical system further may include a first quarter wave plate disposed between the first polarizing beam splitter and the target device. The optical system further may include an aperture stop positioned between the first polarizing beam splitter and the second polarizing beam splitter. The at least one line scan camera may include two line scan cameras, each including a single row of pixels that are configured to capture data. The at least one lens may include a first convex lens, a biconcave lens, and a second convex lens. The optical system further may include a beam splitter disposed between the at least one lens and the image detector, with the beam splitter being configured to receive the beam of electromagnetic radiation from the at least one lens and to split the beam of electromagnetic radiation. The diffraction grating device may be a two-dimensional diffraction grating device configured to receive a portion of the beam of electromagnetic radiation from beam splitter and to direct the portion of the beam of electromagnetic radiation back to the beam splitter, which is configured to re-combine diffracted electromagnetic radiation. The broadband light source may include a laser having a spatial filter. The fast steering mirror may include a reflective surface that can be manipulated to control a direction of the reflection of electromagnetic radiation off of the reflective surface. The optical system further includes a housing configured to support select components of the optical system, including the autocollimator.

Another aspect of the present disclosure is directed to a method of measuring tilt of a target device. In one embodiment, the method comprises: generating a beam of electromagnetic radiation; and directing the beam of electromagnetic radiation to an autocollimator configured to receive the beam of electromagnetic radiation, direct the beam of electromagnetic radiation to a target device, and direct the beam of electromagnetic radiation to an image detector. The autocollimator is configured to direct the beam of electromagnetic radiation to the target device and to receive the beam of electromagnetic radiation reflected off of the target device, split the beam of electromagnetic radiation into a first portion and a second portion, capture an image of the first portion of the beam of electromagnetic radiation with an image detector, direct a second portion of the beam of electromagnetic radiation to a diffraction grating device configured to combine diffracted electromagnetic radiation, and direct the diffracted electromagnetic radiation to at least one line scan camera configured to measure an interference pattern of diffracted electromagnetic radiation and capture an image.

Embodiments of the method further may include configuring the autocollimator to receive the beam of electromagnetic radiation from a broadband light source through a collimation lens. The autocollimator further may be configured to direct the beam of electromagnetic radiation from the collimation lens to a first polarizing beam splitter by a fold mirror. The autocollimator further may be configured to direct the beam of electromagnetic radiation from the first polarizing beam splitter to a target device through a first quarter wave plate. The autocollimator further may be configured to direct the beam of electromagnetic radiation from the first polarizing beam splitter to a second polarizing beam splitter through an aperture stop. Directing the beam of electromagnetic radiation to the image detector may include directing the beam of electromagnetic radiation through a beam splitter disposed between at least one lens and the image detector, with the beam splitter being configured to receive the beam of electromagnetic radiation from the at least one lens and to split the beam of electromagnetic radiation. The diffraction grating device may be a two-dimensional diffraction grating device configured to receive the second portion of the beam of electromagnetic radiation from beam splitter and to direct the second portion of the beam of electromagnetic radiation back to the beam splitter, which is configured to re-combine diffracted electromagnetic radiation. The at least one line scan camera may include two line scan cameras, each including a single row of pixels that are configured to capture data.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
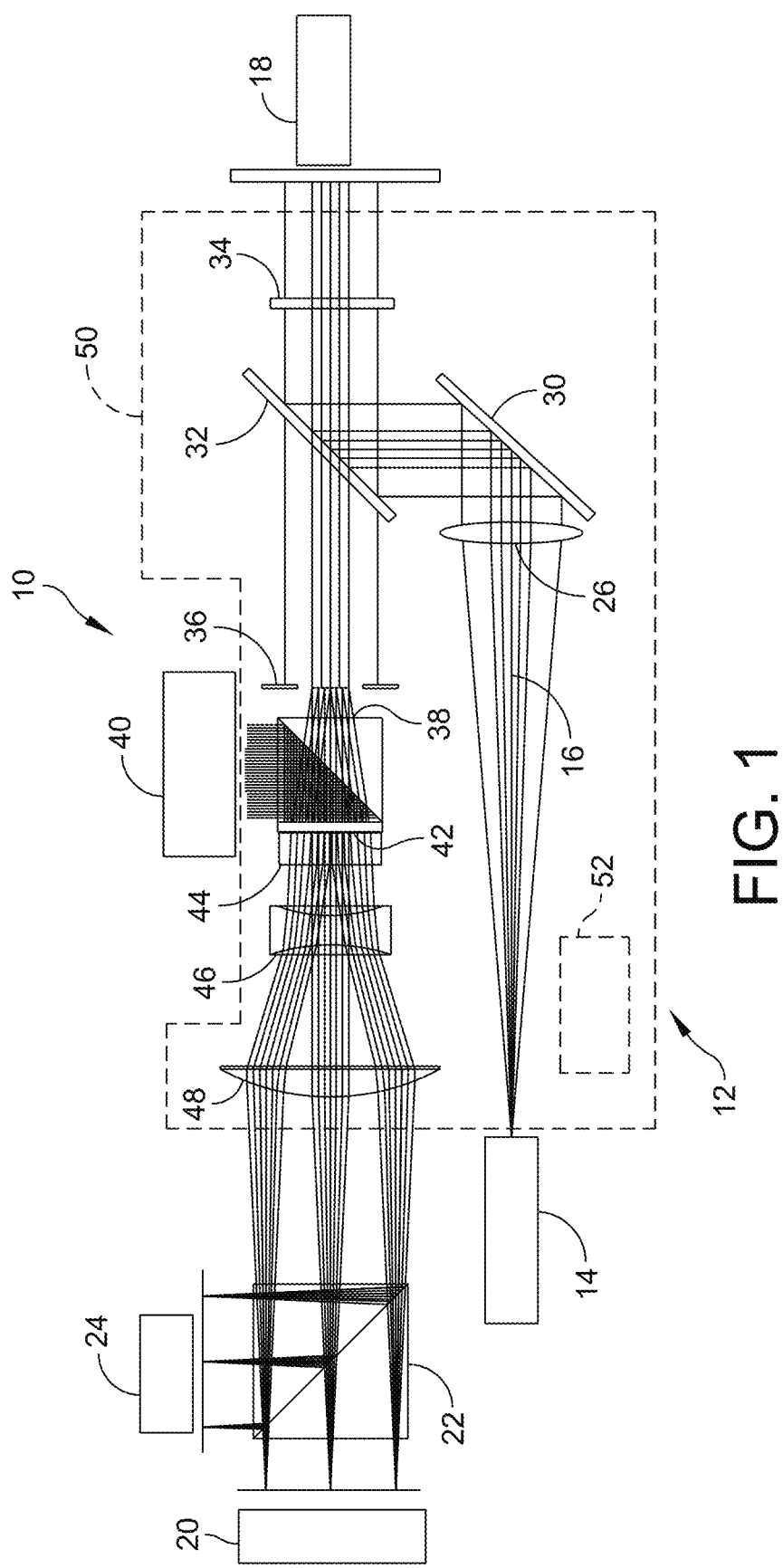
FIG. 1 is a schematic view of an optical system having a high speed wide field autocollimator of an embodiment of the present disclosure.

Conventional auto-alignment systems based on position-sensing detectors (PSDs) suffer from a trade-off amongst resolution, range, and size and cost considerations. Although there are several technologies that work relatively well in the visible (approximately 0.39-0.7 micrometers) or short-wave infrared (approximately 1-3 micrometers) spectral bands, there is presently no position sensing device operating in the longwave infrared (approximately 8-12 micrometers) that can track an auto-alignment beam over a large range of angles.

An autocollimator is an optical instrument for non-contact measurement of angles. An autocollimator is typically used to align components and measure deflections in optical or mechanical systems and works by projecting an image onto a target mirror and measuring the deflection of the returned image against a scale, typically by an electronic detector. Electronic and digital autocollimators are used as angle measurement standards, for monitoring angular movement over long periods of time and for checking angular position repeatability in mechanical systems. An electronic autocollimator is typically calibrated to read the actual mirror. Autocollimation is an optical setup where a collimated beam of parallel light leaves an optical system and is reflected back into the same system by a plane mirror. Autocollimation is used for measuring small tilting angles of the mirror, or for testing the quality of the optical system or of a part of it.

In some embodiments, angular measurement range is limited by optical design, and wide-angle measurement usually means coarse angular resolution for autocollimators. Increasing angular resolution requires more pixels which slows down sample rates. Some have solved the sample rate problem by windowing regions of interest on the detector array, but this still requires a large number of pixels.

Embodiments of the present disclosure are directed to an improved collimator configuration. The collimator includes line scan camera having CCD and/or CMOS sensors with a high index of refraction that results in a large portion of the incident light being reflected. Typically, this is a problem for stray light control in which back reflected light is used to track the location of a focused spot on a large format detector at high speed. The CCD or CMOS sensor acts like a diffraction grating in reflection due to the periodic structure of the pixels. The back reflected diffraction orders can be recombined to create an interference pattern. The phase of the fringe pattern indicates where the focused spot is on the CCD or CMOS detector array (better than 1/100th of a pixel resolution is attainable and was demonstrated, 1/1000th pixel should be possible with good SNR). The location of the spot on the detector array indicates angle over a large angle range at 30 samples per second. The phase of the fringes can be used to recover high-frequency information at line scan sample rates of 80,000 samples per second or faster.

In one embodiment, the autocollimator combines high measurement range with fine resolution and fast measurement rates.

In one embodiment, the autocollimator includes a line scan camera that can sample at high rates, e.g., 300 kHz.

In one embodiment, the line scan camera includes a CMOS sensor with high quantum efficiency and low noise for better images.

In some embodiments, the autocollimator has a 20×15 degree functional field of view (FFOV), a 300 kHz sample rate, and a 100 nrad jitter resolution. An absolute accuracy requires calibration, e.g., 1 urad, and can be implemented with or without separate diffraction grating component.

In one embodiment, the autocollimator includes a two-dimensional camera, such as a Falcon 4 camera provided by DALSA. The two-dimensional camera is an ultra-high resolution and high speed CMOS camera, having 86 megapixels at 16 fps and a global shutter. The two-dimensional camera is configured to achieve large area, high resolution, high speed imaging. The two-dimensional camera can also be sensitive into the NIR spectrum.

A diffraction grating device is an optical component that is configured to split and diffract light into several beams travelling in different directions. The directions of the beams depend on the spacing of the grating and the wavelength of the light so that the grating acts as a dispersive element.

A quarter-wave plate includes an adjusted orientation of a birefringent material, such that the light associated with a larger index of refraction is retarded by 90° in phase, e.g., a quarter wavelength, with respect to that associated with the smaller index.

A polarizing beam splitter is configured to split an incident beam into two beams of differing linear polarization. For an ideal polarizing beam splitter, the two beams are fully polarized, with orthogonal polarizations. Unlike absorptive polarizers, polarizing beam splitters do not need to absorb and dissipate the energy of the rejected polarization state, and so they are more suitable for use with high intensity beams, such as laser light.

Fast steering mirror systems are known, and provide the backbone of some conventional sensors and/or video systems. A fast steering mirror is configured to manipulate a reflective surface to control a direction of the reflection of electromagnetic radiation, including light, off of the reflective surface. The fast steering mirror further is configured to steer the reflective surface as a unit, and can be deployable within a sensor or video system, and/or may form part of a vehicle, vessel, or aircraft carrying such a sensor or video system (e.g., an unmanned vehicle, vessel, or aircraft). In one embodiment, the fast steering mirror includes a fixed base, a pivot flexure or bearing, which couples the reflective surface to the base, and several actuators, which move the reflective surface relative to the base. In use, the base is mounted within the larger system that the fast steering mirror operates (e.g., within a larger sensor system).

In one embodiment, the fold mirror is a flat mirror configured to direct the beam of magnetic radiation to a desired target.

In one embodiment, a collimation lens includes a curved mirror or lens with some type of light source and/or an image at its focus. This can be used to replicate a target focused at infinity with little or no parallax. The collimation lens is an optical lens configured to make parallel the light that enters the lens. The collimation enables the control of field of view, collection efficiency and spatial resolution, and to configure illumination and collection angles for sampling.

A spatial filter is an optical device that uses the principles of Fourier optics to alter the structure of a beam of electromagnetic radiation, e.g., laser light. Spatial filtering is commonly used to "clean up" the output of lasers, removing aberrations in the beam due to imperfect, dirty, or damaged optics, or due to other variations. The term "filtering" indicates that the desirable structural features of the original source pass through the filter, while the undesirable features are blocked.

Referring to the drawings, and more particularly to FIG. 1, an optical system is generally indicated at 10. As shown, the optical system 10 includes a high speed wide field laser autocollimator, generally indicated at 12, which is configured to align components and measure deflections of a target in the optical system 10. Specifically, in the shown embodiment, the optical system 10 includes a broadband light source, e.g., a laser having a spatial filter, indicated at 14, that is configured to generate electromagnetic radiation 16, e.g., a beam of light, and to direct the electromagnetic radiation 16 to the laser autocollimator 12. The laser autocollimator 12 is configured to direct the electromagnetic radiation 16 to a target mirror 18, such as a fast steering mirror, or other optical device requiring measurement and/or detection. The target mirror 18 sometimes is referred to herein as a target device. The optical system 10 further includes a two-dimensional camera 20, with the laser autocollimator 12 being designed to direct the electromagnetic radiation 16 from the target mirror 18 to the two-dimensional camera 20 and measure the deflection of the returned image against a scale. The two-dimensional camera 20 is sometimes referred to as an image device.

The target mirror 18 includes a reflective surface that can be manipulated to control a direction of the reflection of electromagnetic radiation 16, including light, off of the reflective surface. The target mirror 18 further is configured to steer the reflective surface as a unit, and can be deployable within a sensor or video system, and/or may form part of a vehicle, vessel, or aircraft carrying such a sensor or video system (e.g., an unmanned vehicle, vessel, or aircraft). In one embodiment, the target mirror 18 embodies a fast steering mirror that includes a fixed base, a pivot flexure or bearing, which couples the reflective surface to the base, and several actuators, which move the reflective surface relative to the base. In use, the base is mounted within the larger system that the fast steering mirror operates (e.g., within a larger sensor system).

In one embodiment, the two-dimensional camera 20 is a Falcon 4™ camera provided by DALSA Inc. In the shown embodiment, the two-dimensional camera 20 is an ultra-high resolution and high speed CMOS camera, having 86 megapixels at 16 fps and a global shutter. The two-dimensional camera 20 is configured to achieve large area, high resolution, high speed imaging. The two-dimensional camera can also be sensitive into the near-infrared spectrum. The measurable field of view is limited to the size of the two-dimensional camera 20, but supplemented in the manner described below.

The optical system 10 further includes a beam splitter 22 that is configured to direct a portion of the electromagnetic radiation 16 to the two-dimensional camera 20 and direct a portion of the electromagnetic radiation 16 to a two-dimensional diffraction grating device 24, which separates and structures the electromagnetic radiation 16. The two-dimensional diffraction grating device 24 is configured to split and diffract the electromagnetic radiation 16 into several beams travelling in different directions. The directions of the beams depend on the spacing of the grating and the wavelength of the electromagnetic radiation 16 so that the grating acts as a dispersive element. The portion of the electromagnetic radiation 16 directed to the two-dimensional diffraction grating device 24 is returned to the beam splitter 22 and directed to a one-dimensional camera, e.g., a line scan camera, where the diffraction orders interfere to create line fringes.

The optical system 10 can be configured without the two-dimensional diffraction grating device 24 or with a separate one-dimensional diffraction grating device.

The laser autocollimator 12 includes a collimation lens 26, which receives electromagnetic radiation 16 from the laser 14. The collimation lens 26 is configured to align the electromagnetic radiation 16 in parallel. The laser autocollimator 12 further includes a fold mirror 30 that is positioned to receive electromagnetic radiation 16 from the collimation lens 26 and reflect the electromagnetic radiation 16. In one embodiment, the fold mirror 30 is a flat mirror that is configured to direct the beam of magnetic radiation 16 to a desired target.

The laser autocollimator 12 further includes a first polarizing beam splitter 32 that is configured to receive electromagnetic radiation 16 from fold mirror 30 and direct the electromagnetic radiation 16 to the target mirror 18. The laser autocollimator 12 further includes a first quarter wave plate 34 disposed between the first polarizing beam splitter 32 and the target mirror 18. The first quarter wave plate 34 is configured to alter the polarizing state of the electromagnetic radiation 16. The target mirror 18 reflects the electromagnetic radiation 16 back through the first quarter wave plate 34 and the first polarizing beam splitter 32, which directs to the electromagnetic radiation 16 to an aperture stop 36. The aperture stop 36 is sized to limit an amount of light that can reach a focal plane. The size of the aperture stop 36 can be selected based on the intended use.

The laser autocollimator 12 further includes a second polarizing beam splitter 38, which is configured to direct the electromagnetic radiation 16 from the aperture stop 36 to the beam splitter 22 and the two-dimensional camera 20 and the diffraction grating device 24. The diffracted electromagnetic radiation is directed back toward the second polarizing beam splitter 38, which is configured to direct the diffracted electromagnetic radiation toward line scan cameras configured to capture data. In the shown embodiment, two line scan cameras are provided, which are together indicated at 40. In one embodiment, each line scan camera is a Linea™ camera provided by DALSA Inc., which includes a single row of pixels that are used to capture data very quickly. The line scan cameras 40 measure the phase of the interference fringes that indicate where the beam is focused on a grating groove or a two-dimensional array pixel. A 2 pi phase change of the measured sine wave on the line scan camera corresponds to a one-groove or one-pixel motion of a focused beam. As the object moves past the line scan camera, a complete image can be reconstructed line by line. The line scan cameras 40 are capable of measuring tilt of the electromagnetic radiation 16 reflected off of the target mirror 18 over wide angles. Moreover, the line scan cameras 40 can sample images at high rates, e.g., 300 kHz. In one embodiment, each line scan camera includes a CMOS sensor with high quantum efficiency and low noise for better images.

The second polarizing beam splitter 38 is configured to direct electromagnetic radiation to travel from the first polarizing beam splitter 32 to the beam splitter 22 and to direct diffracted electromagnetic radiation back to the first polarizing beam splitter 38. The laser autocollimator 12 further includes a second quarter wave plate 42 and a series of lenses, including a convex lens 44, a biconcave lens 46, and another convex lens 48, which are positioned adjacent the second polarizing beam splitter 38. The electromagnetic radiation 16 is manipulated by the lenses 44, 46, 48 and directed to the beam splitter 22, which as mentioned above is configured to direct the electromagnetic radiation 16 to the beam splitter 22, which in turn directs a portion of the electromagnetic radiation to the two-dimensional camera 20 and a portion of the electromagnetic radiation to the two-dimensional diffraction grating device 24. The two-dimensional diffraction grating device 24 is configured to separate and structure the electromagnetic radiation 16. As mentioned above, the two-dimensional camera 20 can be provided alone and function as a diffraction grating in reflection due to the periodic structure of the pixels. The back reflected diffraction orders can be recombined to create an interference pattern, which is measured by the two-dimensional camera 20.

The components of the optical system 10 are secured in a case or housing 50, which is represented by dashed lines in FIG. 1. The housing 50 embodies and supports the components of the laser autocollimator 12. Specifically, the housing 50 can be formed and configured to support the collimation lens 26, the fold mirror 30, the first polarizing beam splitter 32, the first quarter wave plate 34, the aperture stop 36, the second polarizing beam splitter 38, the second quarter wave plate 42 and the series of lenses 44, 46, 48. The housing 50 can also configured to support the remaining components of the optical system 10, including the laser 14, the beam splitter 22, the two-dimensional grating device 24, the two-dimensional camera 20, and the line scan cameras 40. In one embodiment, the housing 50 is fabricated from a suitable metal material, such as an aluminum alloy.

In some embodiments, the optical system 10 can include a controller 52, to control the operation of the movable components of the optical system 10. For example, the controller 52 can be configured to control the laser 14, the line scan cameras 40 and the two-dimensional camera 20.

Figure 2:
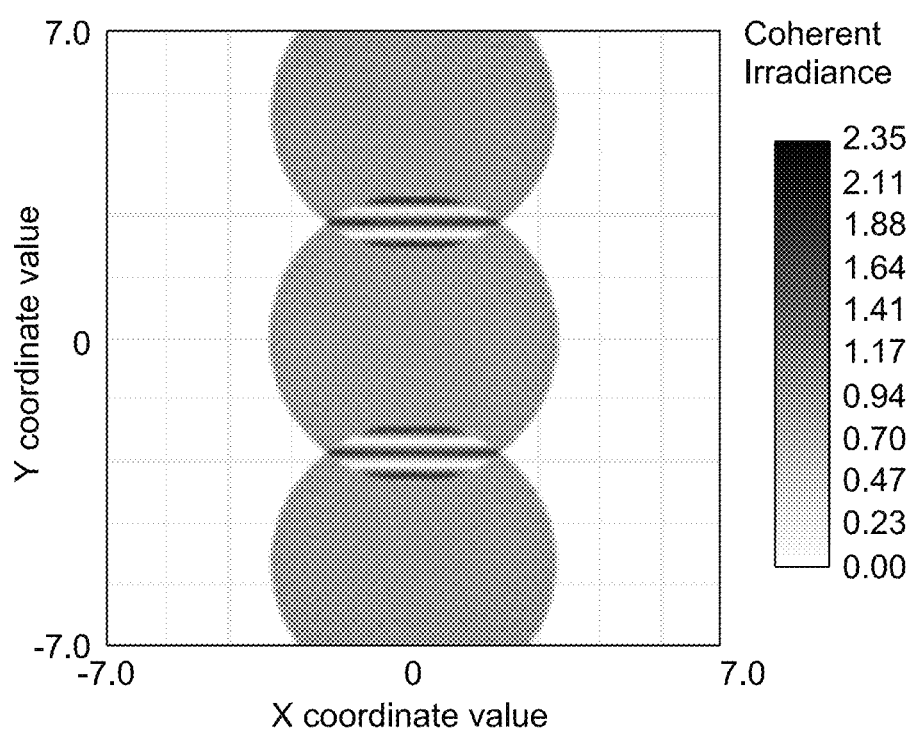
FIG. 2 is a graph showing a ray trace pattern in one direction.

FIG. 2 is a graph showing an interference pattern generated by ray traces. This pattern is sampled by one line scan camera perpendicular to the line fringes. The interference pattern is generated by the −1, 0, and +1 diffraction orders. A blazed grating can be used to have two diffraction orders with equal power in each order to maximize fringe modulation.

Figure 3:
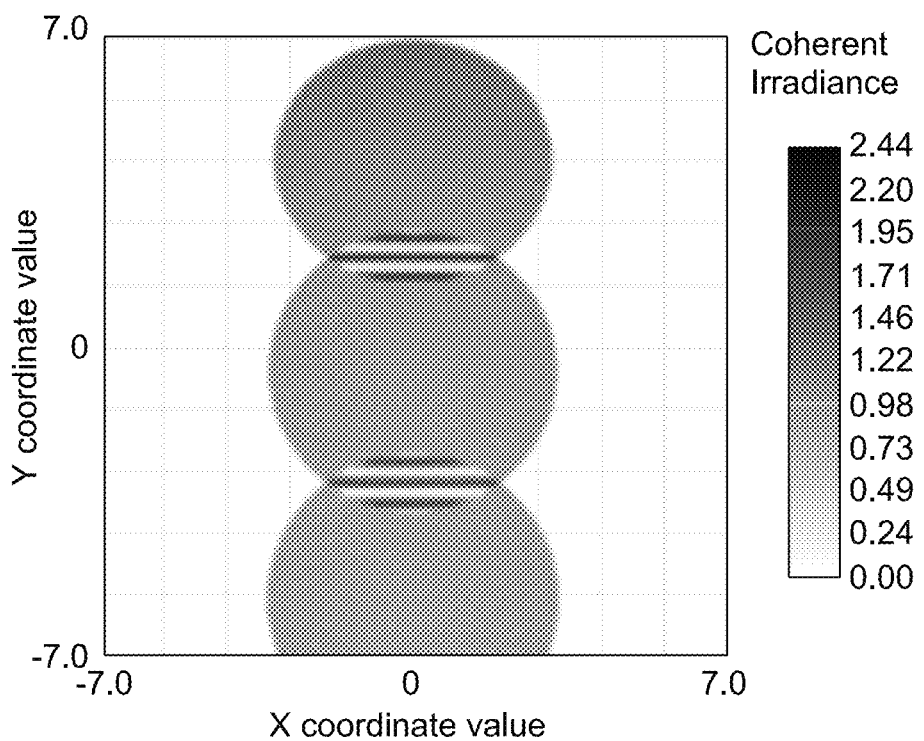
FIGS. 3 and 4 are graphs showing ray trace patterns having small angle shifts.
Figure 4:
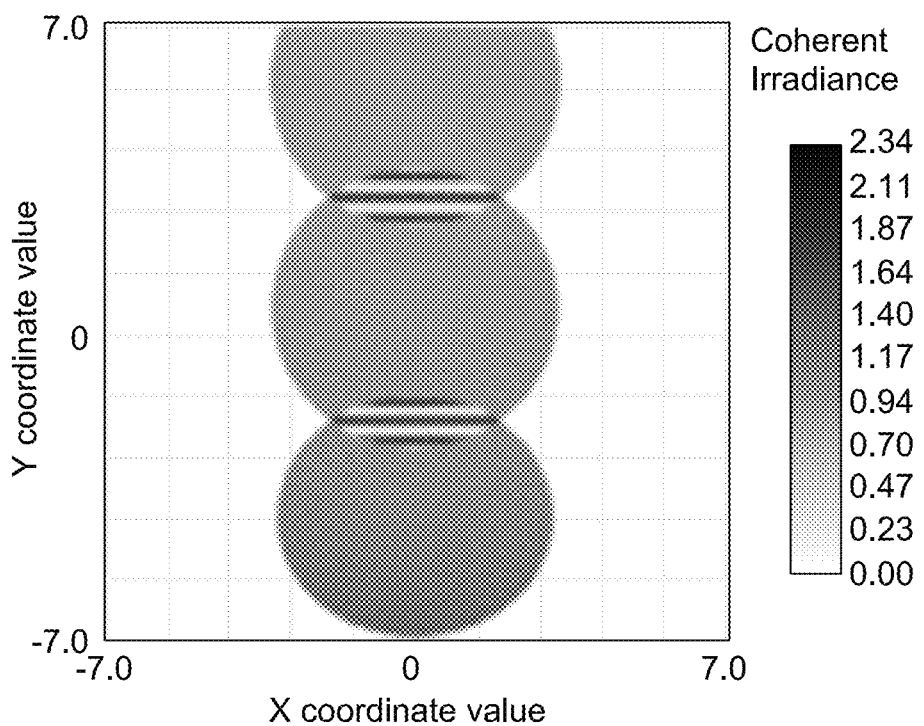

FIGS. 3 and 4 are graphs showing interference patterns having small shifts in phase that indicate angle changes of the mirror under test.

Figure 5:
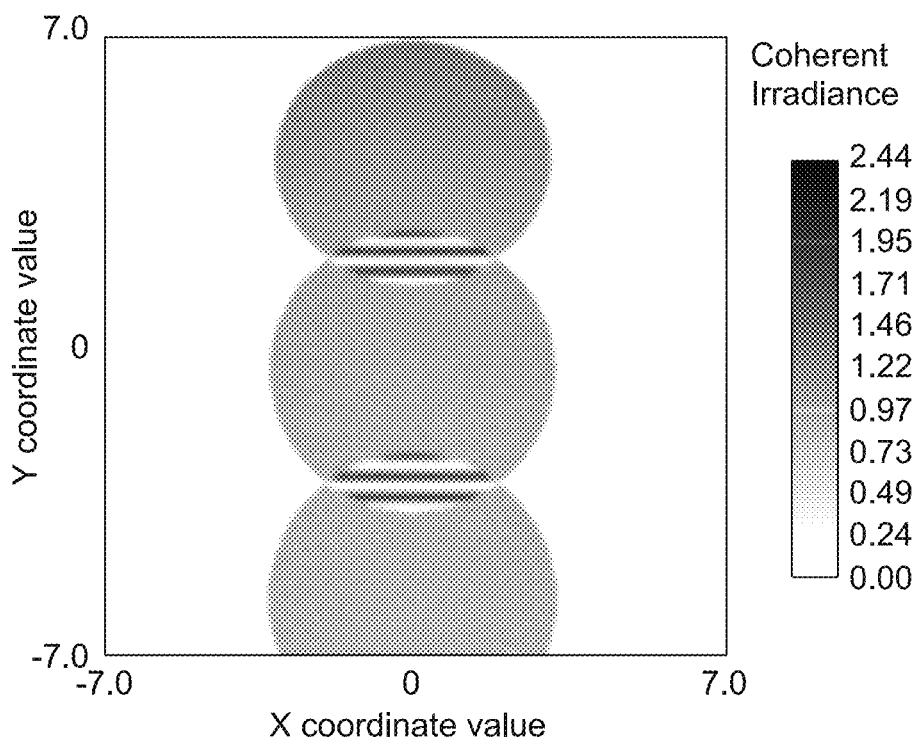
FIGS. 5 and 6 are graphs showing ray trace patterns having maximum mirror travel.
Figure 6:
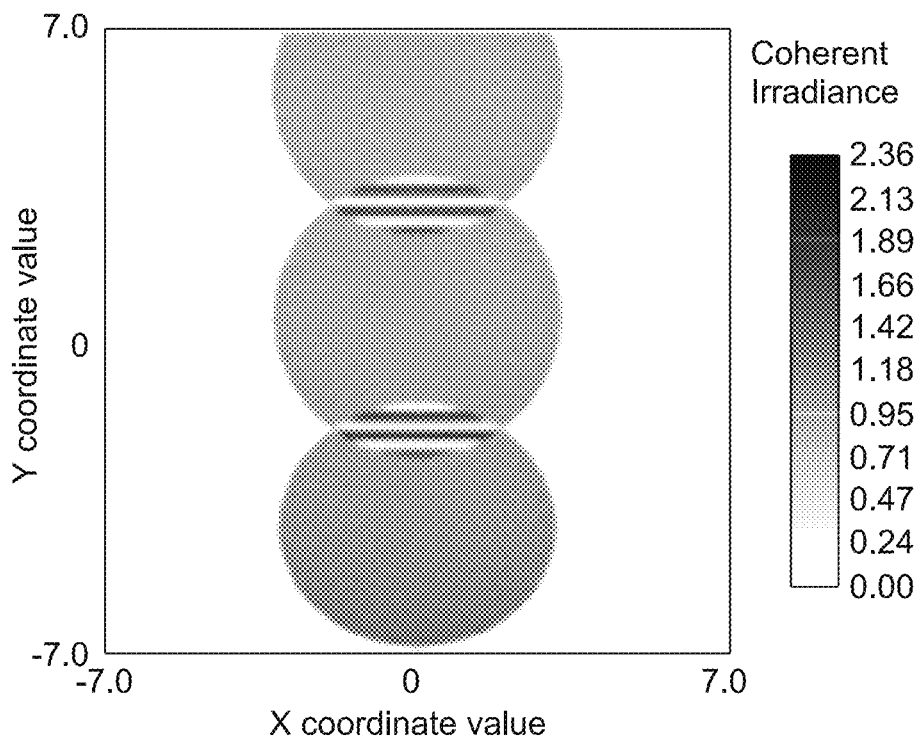

FIGS. 5 and 6 are graphs showing interference patterns having maximum mirror travel.

During operation, the laser 14 generates a beam of light (photons) through a pinhole toward the collimation lens 26, which directs the beam of light to the fold mirror 30. The fold mirror 30 directs the beam of light to the first polarizing beam splitter 32 reflecting, which in turn directs the beam of light to the target mirror 18 through the quarter wave plate 34. The beam of light is reflected off of the target mirror 18 back through the wave plate 34, transmitting through the first polarizing beam splitter 32 and through the aperture stop 36. The beam of light travels to the second beam splitter 38 where it also transmits. Another quarter wave plate 42 converts the polarization state in circular so that the polarizing beam splitter 22 can again divide the light into two beams, with one beam portion directed to the two-dimensional camera 20 where it is measured, and another beam portion directed to the grating device 24. A wave plate may be used between the two-dimensional camera 20 and the beam splitter 22 to prevent transmission of back reflected light from the two-dimensional camera through the polarizing beam splitter. The second beam portion is directed to the diffraction grating device 24, with reflected orders from the diffraction grating being reflected back through the polarizing beam splitter 22, through the lenses 48, 46, 44 and the wave-plate 42. The polarization state of the diffracted electromagnetic radiation then reflects at polarizing beam splitter 38 and is directed to the line scan cameras 40. The two-dimensional camera 20 is configured to measure wide angle tilt while the line scan cameras 40 are configured to measure high-frequency jitter associated with the target mirror 18.

It should be observed that the line scan cameras 40 are configured to produce an interference pattern from the diffracted portion of the electromagnetic radiation 16. Changes in the intensity measured by the plurality of photosensitive detectors over time corresponding to a lateral shift of the interference pattern on the linear detector array (e.g., the line scan cameras 40) indicate an angular tilt of the auto-alignment beam.

In some embodiments, a laser autocollimator 12 having high resolution and high measurement frequency can employ a two-dimensional lateral shearing interferometer to measure tilt of a laser beam over wide angles in place of the line scan cameras 40. A two-dimensional detector provides absolute angular pointing knowledge in case the fringe count is lost. Lateral shearing interferometers are high resolution devices, and also have large measurement range. In particular, a lateral shearing interferometer can be configured to measure small beam tilts using wave interference, as discussed further below, and can be sampled quickly using standard photodiodes. In addition, lateral shearing interferometers may be configured to operate in any optical spectral band, or multiple spectral bands simultaneously using multiplexed interference patterns, including the longwave infrared spectral band. Thus, according to certain aspects and embodiments, a lateral shearing interferometer can be configured using one or more cooled or uncooled imaging sensors to provide the capability to track an auto-alignment beam in the longwave infrared spectral band over a range of angles.

Another embodiment uses the 2-D pixelated array of a normal autocollimator as the diffraction grating for the lateral shearling interferometer. The light reflected from a charge coupled device (CCD) or a complementary metal oxide semiconductor (CMOS) detector contains several diffraction orders which can be used to track beam jitter at high sample rates. The measurable field of view is limited to the size of the detector with this example.

Embodiments of the autocollimator include a shearing interferometer with a typical wide field autocollimator. This coupling allows for wide field measurement along with high speed sampling in a small package. The autocollimator is configured to use back reflected light from the detector array to enhance the measurement resolution and speed of an autocollimator, although it is not necessary to use the back reflected light. Beam splitters and a separate grating component(s) may achieve the same effect with more flexibility.

Thus, aspects and embodiments may provide a robust, accurate, and highly scalable auto-alignment beam tracking system that can be implemented using a small number of detectors (i.e., a linear detector array with only a few pixels). Detectors of state-of-art technology have sample rates that are suitable for performing auto-alignment beam tracking in the LWIR spectral band, a feature not available in conventional auto-alignment beam tracking systems, and further, embodiments of the system disclosed herein can advantageously perform beam tracking in multiple spectral bands either with separate detectors or with two different fringe frequencies on the same detector array, as discussed above. In addition, embodiments of the auto-alignment beam tracking system have better measurement sensitivity than a conventional spot tracking system because the measurements are based on beam interference. Moreover, because the phase measurements are modulo $2\pi$, the range of measurement is large without requiring a large array of detectors, and the system provides a scalable measurement range without needing to increase the number of detectors.

Having described above several aspects of at least one embodiment, it is to be appreciated various alterations, modifications, and improvements will readily occur to those skilled in the art. Such alterations, modifications, and improvements are intended to be part of and within the scope of the present disclosure. The methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the disclosure should be determined from proper construction of the appended claims, and their equivalents.

What is claimed is:

1. An optical system comprising:
   a broadband light source configured to generate a beam of electromagnetic radiation;
   a target device to be tested;
   an image detector configured to measure a tilt of the target device based on a measurement of the beam of electromagnetic radiation reflected off of the target device; and
   an autocollimator configured to receive the beam of electromagnetic radiation from the broadband light source, direct the beam of electromagnetic radiation to the target device, and direct the beam of electromagnetic radiation to the image detector, the autocollimator including
      a first polarizing beam splitter configured to direct the beam of electromagnetic radiation to the target device and to receive the beam of electromagnetic radiation reflected off of the target device,
      a second polarizing beam splitter configured to receive the beam of electromagnetic radiation from the first polarizing beam splitter, direct the beam of electromagnetic radiation to a diffraction grating device, return diffracted electromagnetic radiation from the diffraction grating device to a linear array of detectors, and direct the diffractive electromagnetic radiation,
      at least one line scan camera configured to measure an interference pattern of diffracted electromagnetic radiation from the second polarizing beam splitter and capture an image, and
      at least one lens to focus electromagnetic radiation from the target device to the diffraction grating device.

2. The optical system of claim 1, wherein the autocollimator further includes a collimation lens configured to receive the beam of electromagnetic radiation from the broadband light source.

3. The optical system of claim 2, further comprising a fold mirror configured to direct the beam of electromagnetic radiation from the collimation lens to the first polarizing beam splitter.

4. The optical system of claim 3, further comprising a first quarter wave plate disposed between the first polarizing beam splitter and the target device.

5. The optical system of claim 4, further comprising an aperture stop positioned between the first polarizing beam splitter and the second polarizing beam splitter.

6. The optical system of claim 1, wherein the at least one line scan camera includes two line scan cameras, each including a single row of pixels that are configured to capture data.

7. The optical system of claim 1, wherein the at least one lens includes a first convex lens, a biconcave lens, and a second convex lens.

8. The optical system of claim 1, further comprising a beam splitter disposed between the at least one lens and the image detector, the beam splitter being configured to receive the beam of electromagnetic radiation from the at least one lens and to split the beam of electromagnetic radiation.

9. The optical system of claim 8, wherein the diffraction grating device is a two-dimensional diffraction grating device configured to receive a portion of the beam of electromagnetic radiation from beam splitter and to direct the portion of the beam of electromagnetic radiation back to the beam splitter, which is configured to re-combine diffracted electromagnetic radiation.

10. The optical system of claim 1, wherein the broadband light source includes a laser having a spatial filter.

11. The optical system of claim 1, further comprising a fast steering mirror including a reflective surface that can be manipulated to control a direction of the reflection of electromagnetic radiation off of the reflective surface.

12. The optical system of claim 1, further comprising a housing configured to support select components of the optical system, including the autocollimator.

13. A method of measuring tilt of a target device, the method comprising:
- generating a beam of electromagnetic radiation; and
- directing the beam of electromagnetic radiation to an autocollimator configured to receive the beam of electromagnetic radiation, direct the beam of electromagnetic radiation to a target device, and direct the beam of electromagnetic radiation to an image detector, the autocollimator being configured to
  - direct the beam of electromagnetic radiation to the target device and to receive the beam of electromagnetic radiation reflected off of the target device,
  - split the beam of electromagnetic radiation into a first portion and a second portion,
  - capture an image of the first portion of the beam of electromagnetic radiation with an image detector,
  - direct a second portion of the beam of electromagnetic radiation to a diffraction grating device configured to combine diffracted electromagnetic radiation, and
  - direct the diffracted electromagnetic radiation to at least one line scan camera configured to measure an interference pattern of diffracted electromagnetic radiation and capture an image.

14. The method of claim 13, wherein the autocollimator further is configured to receive the beam of electromagnetic radiation from a broadband light source through a collimation lens.

15. The method of claim 14, wherein the autocollimator further is configured to direct the beam of electromagnetic radiation from the collimation lens to a first polarizing beam splitter by a fold mirror.

16. The method of claim 15, wherein the autocollimator further is configured to direct the beam of electromagnetic radiation from the first polarizing beam splitter to a target device through a first quarter wave plate.

17. The method of claim 16, wherein the autocollimator further is configured to direct the beam of electromagnetic radiation from the first polarizing beam splitter to a second polarizing beam splitter through an aperture stop.

18. The method of claim 13, wherein directing the beam of electromagnetic radiation to the image detector includes directing the beam of electromagnetic radiation through a beam splitter disposed between at least one lens and the image detector, the beam splitter being configured to receive the beam of electromagnetic radiation from the at least one lens and to split the beam of electromagnetic radiation.

19. The method of claim 18, wherein the diffraction grating device is a two-dimensional diffraction grating device configured to receive the second portion of the beam of electromagnetic radiation from beam splitter and to direct the second portion of the beam of electromagnetic radiation back to the beam splitter, which is configured to re-combine diffracted electromagnetic radiation.

20. The method of claim 13, wherein the at least one line scan camera includes two line scan cameras, each including a single row of pixels that are configured to capture data.

* * * * *